June 19, 1934.   W. R. HUME   1,963,553
ART OF ELECTRIC ARC WELDING
Filed Aug. 4, 1933   4 Sheets-Sheet 1

Inventor:
Walter Reginald Hume
Attorney.

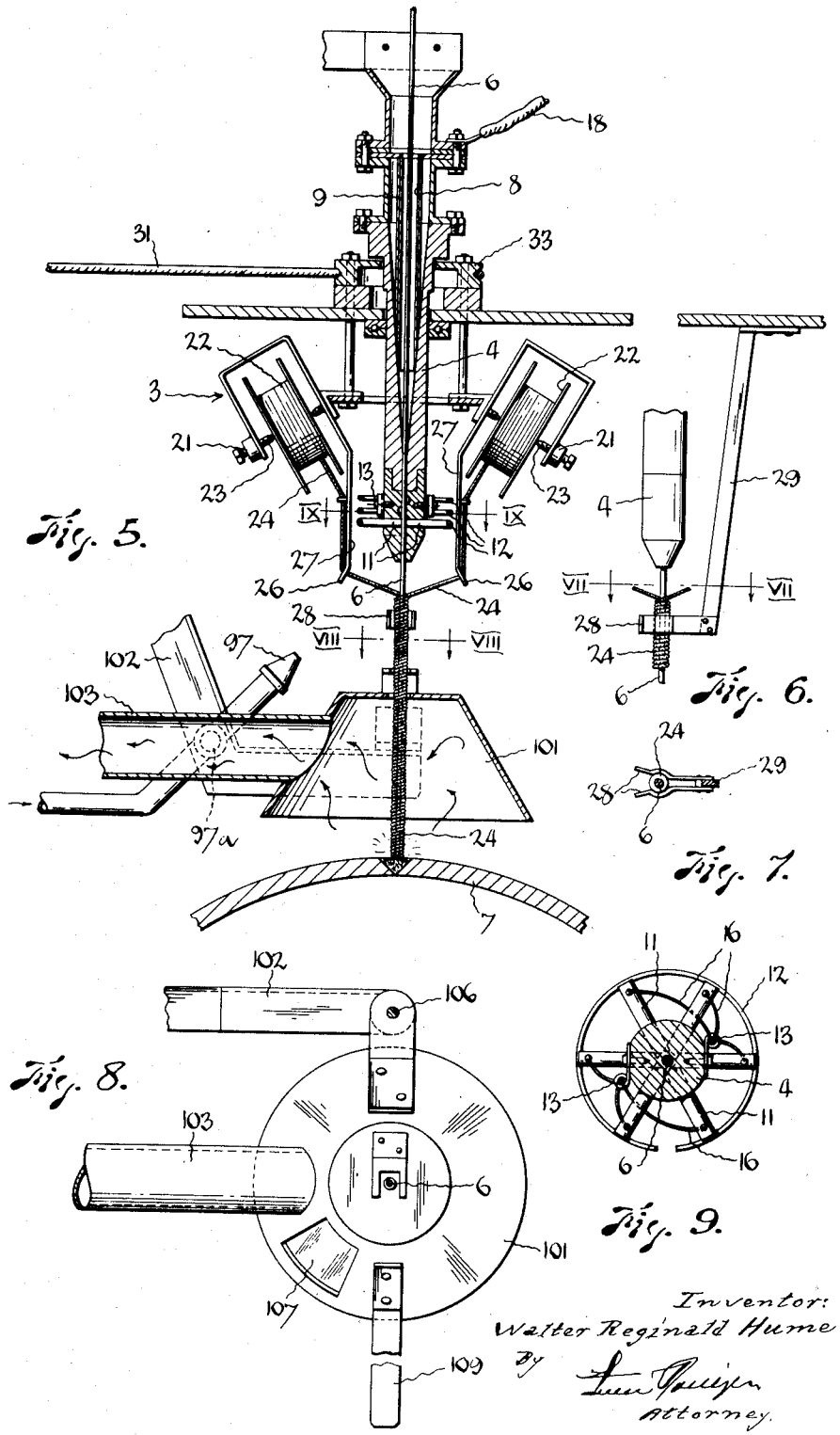

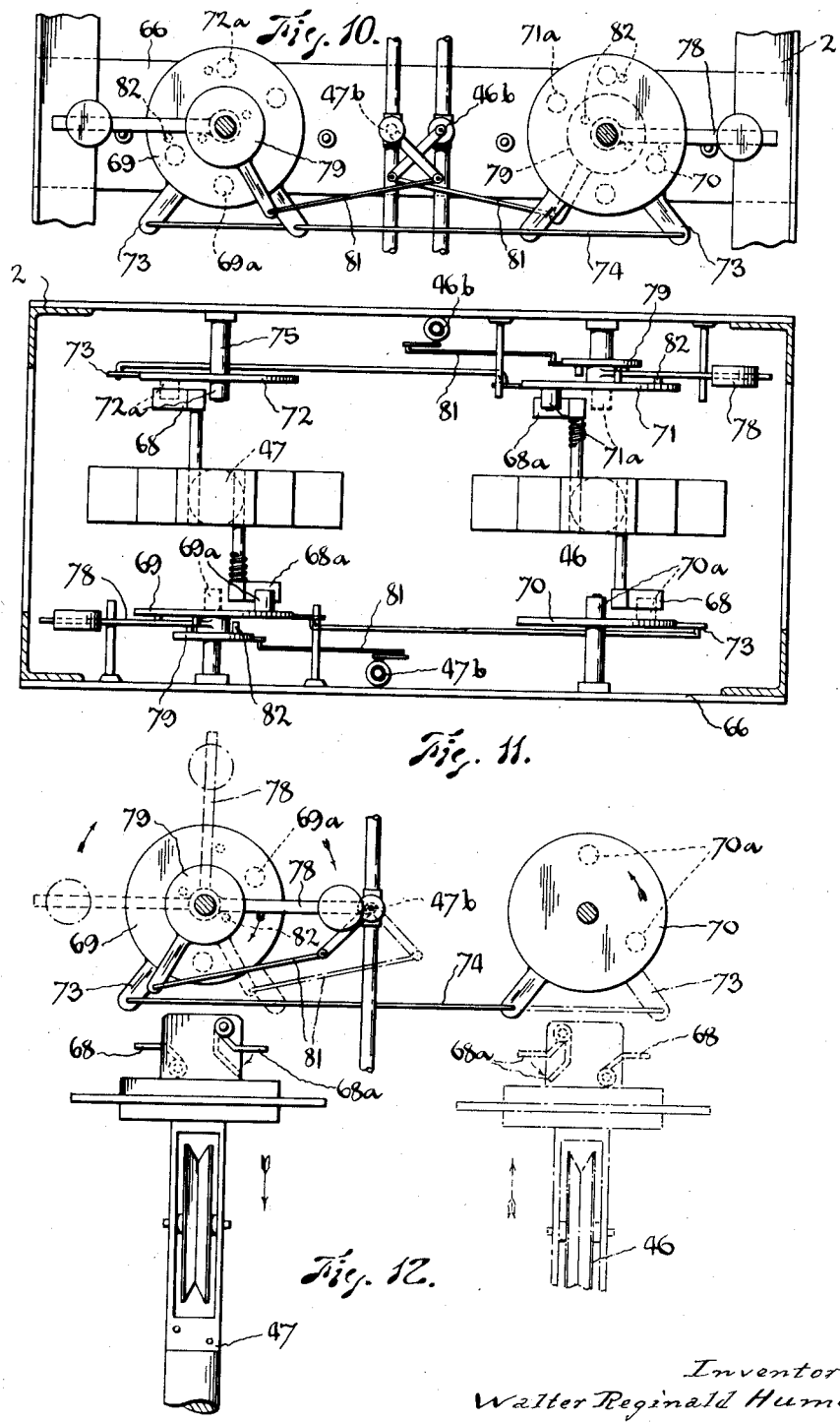

June 19, 1934.  W. R. HUME  1,963,553
ART OF ELECTRIC ARC WELDING
Filed Aug. 4, 1933    4 Sheets-Sheet 4
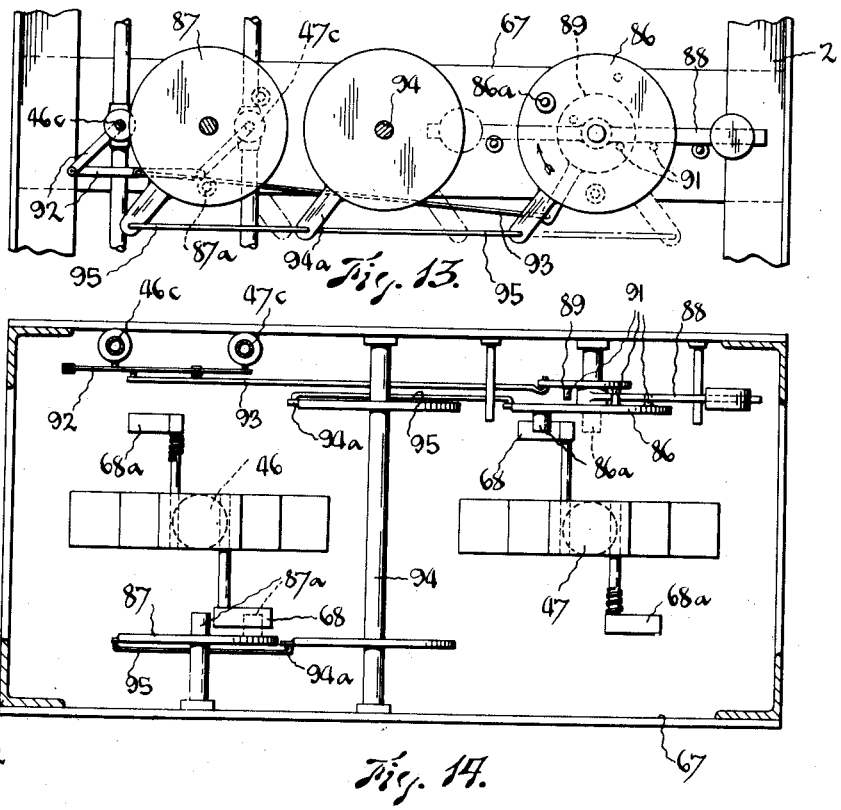
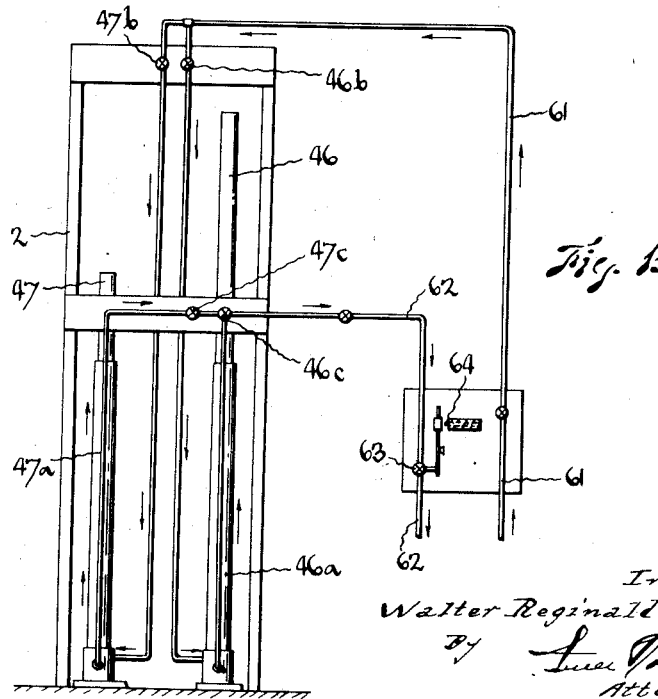
Inventor:
Walter Reginald Hume
By
Attorney Patented June 19, 1934

1,963,553

UNITED STATES PATENT OFFICE 1,963,553

ART OF ELECTRIC ARC WELDING

Walter Reginald Hume, Melbourne, Victoria, Australia, assignor to Hume Steel Limited, Melbourne, Victoria, Australia Application August 4, 1933, Serial No. 683,699
In Australia August 15, 1932

23 Claims. (Cl. 219—8)

This invention relates to the application of coating materials to arc welding electrodes and to the feeding of such electrodes to the work whilst the coating material in the form of a cord or like wrapping, which is covered or impregnated with a substance such as a flux paste, is applied to the electrode.

More particularly the invention refers to apparatus wherein flux impregnated threads are wound onto the electrode from spools mounted upon a rotary carrier which revolves about the electrode, the threads from the various spools being wound in adjoining convolutions about the electrode as the latter is fed forwardly to the work.

One of the objects of the present invention is to provide an improved method and means whereby a flux impregnated combustible thread, such as a cord, tape or the like may be effectively applied, in a moistened condition, to the electrode adjacent its arcing point during welding operations. The flux impregnated thread, whilst still moist, is uniformly compressed onto the electrode and is subsequently baked thereon owing to the evaporation of the moisture due to the heat in the region of the arc thereby causing the thread to become firmly attached to the electrode and effectively preventing unravelling or displacement of the thread which also exercises a cooling influence upon the electrode and obviates damage to the coating and other difficulties attendant upon the use of covered electrodes, particularly when an alternating current is employed in the welding circuit instead of a direct current as is usual in arc welding operations. The application of the moistened flux coated thread to the electrode as above mentioned also permits of the maintenance of a high conductivity in the electrode and enables a much heavier current than usual to be passed through the electrode which is preferably of the continuous wire type and may be automatically fed from a supply reel or the like to the work and progressively coated over a short length adjacent the arcing point as hereinafter described.

A further object of the invention is to provide improved means for continuously feeding the electrode forwardly to the work through the medium of an operating mechanism such as a pair of hydraulic rams which are connected to the electrode by flexible lines, chains or bands acting upon a free wheel device which co-operates with the feed rollers or like electrode feeding gear so that by alternate operation of the two rams a continuous forward motion of the electrode is obtained through the intermediary of the free wheel device which permits the rams to move in a reverse direction without affecting the movement of the electrode.

In applying such covering threads to electrodes, as aforesaid, difficulty has been experienced in uniformly winding the cords or threads onto the electrode with the result that in some portions of the coating the convolutions overlap each other causing an excessively thick coating whilst at other parts spaces are left between the convolutions so that these uncovered portions of the electrode cause the arc to travel erratically and deposit the welding metal in an irregular or wavy form. The present invention also aims at overcoming this disadvantage by the provision of means for uniformly laying or pressing the coating threads upon the electrode as the cord or like windings are applied thereto. By such means a smooth and regular coating of uniform thickness is applied to the surface of the electrode in a simple and efficient manner.

Another difficulty hitherto encountered in thus applying the coating material to the electrode as the latter is fed to the work is that owing to frictional resistance and the dead load or inertia of the rotary spool carrier, which is driven from the electrode feeding mechanism, the electrode is caused to lag when starting its feed motion so that instead of the electrode moving promptly forward when the arc is struck, the initial feed movement is retarded causing the arc to lengthen and in some cases to become extinguished. A further object of the present invention is to overcome this latter difficulty by the introduction of a resilient element or connection between the spool carrier and the electrode feed mechanism so that the electrode will move promptly forward when the arc is struck and a limited independent movement of the electrode and the spool carrier in relation to each other is provided for owing to the elasticity or resilience of said element or connection.

The invention also includes a novel hydraulic valve gear and associated mechanism for controlling the feed of the electrode, a spraying device for projecting a cooling spray of water onto the electrode and other parts adjacent the point where the electrode coating is applied and means for withdrawing the fumes arising from the arc so that the workmen or attendant is protected therefrom.

The foregoing and other objects and features of the invention will, however, be better understood from the following description which refers to a suitable practical embodiment thereof.

Referring to the drawings which form part of this specification:—

Figure 2 is a front view of the parts seen in Figure 1.

Figure 5 is an enlarged vertical section showing a rotary spool carrier and adjacent parts of the machine seen in Figures 1 and 2.

Figure 6 is a fragmentary side elevation of portion of Figure 5 and showing means for uniformly pressing the convolutions of the aforesaid flux impregnated threads around the electrode.

Figure 7 is a sectional plan view taken on the line VII—VII of Figure 6.

Figure 8 is another sectional plan view taken on the lines VIII—VIII of Figure 5 and showing a protective hood and associated means for withdrawing the gases generated during the welding operations.

Figure 9 is an enlarged sectional plan view taken on the lines IX—IX of Figure 5 and showing a plurality of electrical contacts carried by the electrode directing nozzle and adapted to engage the electrode.

Figure 10 is a cross section on an enlarged scale showing mechanism for automatically operating the inlet valves of the pair of hydraulic rams seen in Figures 1 and 2.

Figure 11 is a plan view of the parts seen in Figure 10 and showing co-operating tappet members carried by the respective rams.

Figure 12 is a semi-diagrammatic side elevation showing the operative positions assumed by portion of the inlet valve gear during the opening and closing of one of the inlet valves.

Figure 13 is an enlarged cross section looking at the rear of valve gear for automatically opening and closing the outlet valves of the aforesaid hydraulic rams.

Figure 14 is a plan view of Figure 13 together with the co-operating tappet members on the respective rams.

Figure 15 is a diagrammatic side elevation showing the pair of hydraulic rams, a system of liquid supply and exhaust pipes communicating with said rams and a series of automatically operated valves for controlling the passage of liquid through the pipe system.

Figure 1:
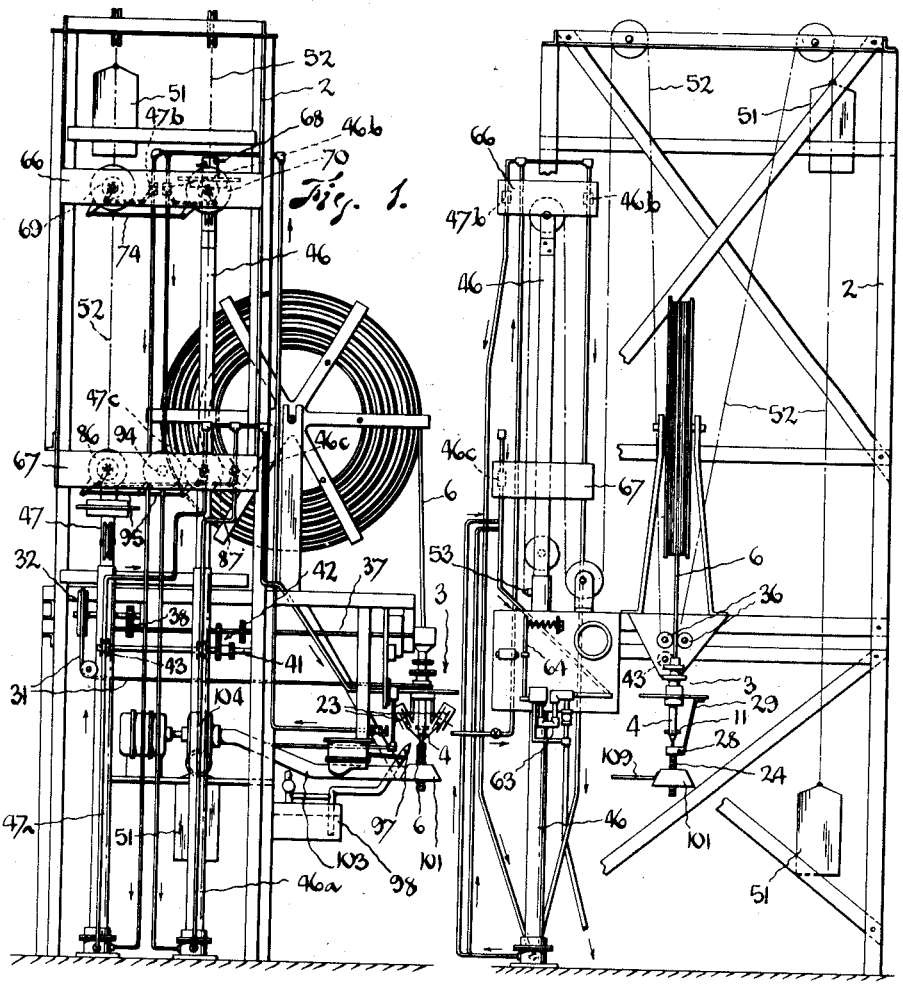
Figure 1 is a semi-diagrammatic side elevation of an electric arc welding machine in accordance with the present invention.

The invention includes a machine frame 2 supporting a rotary spool carrier 3 which is mounted to rotate about a guide sleeve 4 through which the electrode 6 passes downwardly to the work 7. This sleeve may be fitted with a metal liner 8 surrounded by an insulating sleeve 9 and is provided near its lower end with a plurality of contact pins 11 passing radially into the sleeve and engaging at their outer ends spring rings 12 as seen more clearly in Figure 9, whereby the contacts are pressed closely against the electrode and the welding current is positively fed thereto near the arcing point.

If desired six contact pins 11 may be employed and these pins are preferably arranged in three sets of two pins, each set being electrically connected to one of a pair of terminal members 13. The electrical connections between the terminals and their respective contact pins may consist of flexible tapes or bands 16 fixed at their inner ends to one of the terminal members and at their outer ends to the contact pins, said tapes being capable of flexing around the guide sleeve 4 as shown. Current is supplied to the terminals 13 through the guide sleeve which may be charged with current through a lead 18.

Mounted in suitable bearings 21 upon the spool carrier 3 is a series of spools 22, the axes 23 of which are preferably downwardly and outwardly inclined. From these spools the various cords or threads 24 to form the electrode coating are led onto the electrode 6 through eyelets 26 in guide members 27 which may extend downwardly from the spool carrier at circumferentially spaced intervals around the said guide sleeve.

The aforesaid means for uniformly applying the coating threads to the electrode preferably comprises a pair of plate spring members 28 which may be supported upon an arm or the like 29 depending from the spool carrier as seen in Figures 6 and 7. These spring members 28 may extend upon opposite sides of and in close proximity to the electrode and are adapted to press the coating threads 24 (which are saturated or moistened by previous impregnation with a suitable flux paste), closely against the electrode. Thus any overlapping or projecting portions of the coating material are flattened out and any spaces or gaps between the windings are filled in by the coating, thereby ensuring a uniform and efficient covering.

The rotary spool carrier 3 is driven by a suitable driving connection from the electrode feeding mechanism and in order to prevent the electrode feed movement from being retarded and adversely influenced as aforesaid by frictional resistance and inertia due to such interconnection of the electrode feeding gear and the spool carrier, the said driving connection includes a suitable resilient element or device which permits of a limited degree of independent relative movement between the electrode and the spool carrier. By this means the electrode is permitted to move forwardly immediately the arc is struck without retardation by the spool carrier and sufficient energy may be accumulated in said driving connection to initiate the rotation of the spool carrier and enable the latter to quickly assume its normal speed of rotation.

The above mentioned resilient device may conveniently consist of an endless rubber driving band 31 arranged to transmit motion from a pulley or the like 32 geared to the electrode feed mechanism, to another pulley 33 on the spool carrier. Thus when the arc is struck the elasticity or resilience of said driving band 31 permits the electrode to move forward immediately without being retarded by the inertia to be overcome at the commencement of rotation of the spool carrier. The tension thus exerted in the elastic driving band also assists the initial movement of the spool carrier which quickly assumes its normal speed of rotation.

It will be evident also that the resilience of the driving connection relieves the electrode feeding gear of momentary resistances to rotation of the spool carrier which may occur during the winding of the threads onto the electrode.

In lieu of the rubber driving band 31 other suitable means such, for example, as a spring or springs may be arranged to provide the desired resilient effect in the driving connection between the electrode feed mechanism and the spool carrier in order to afford the result referred to.

Figures 3, 4:
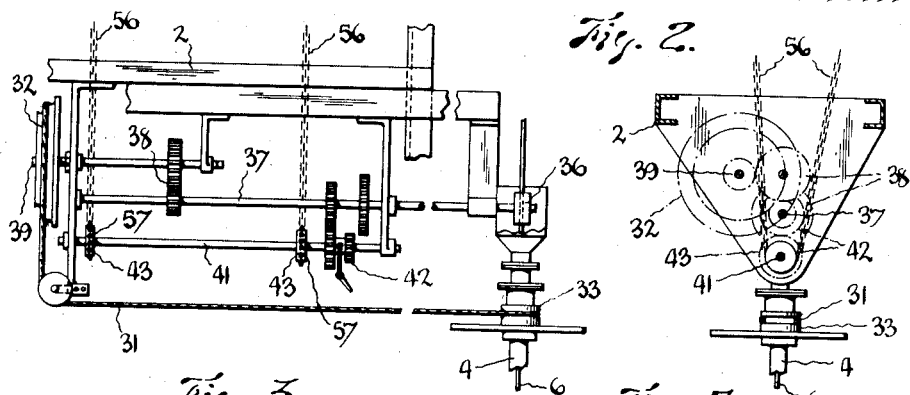
Figure 3 is a side elevation on an enlarged scale showing free wheel driving mechanism for operating electrode feed rollers and winding means for applying one or more flux impregnated threads to the electrode.
Figure 4 is a cross section of Figure 3.

As seen in Figures 3 and 4, the electrode feeding means may comprise a plurality of feed rollers 36 driven by a shaft 37 which is geared as at 38 to a countershaft 39 carrying the aforesaid pulley 32. The shaft 37 is in turn driven from a lay shaft 41 by means of adjustable selective gearing 42, said lay shaft being power driven by a free wheel device 43 as hereinafter described.

The electrode feed movement is preferably effected in accordance with the invention by means of a pair of co-operating hydraulic rams 46 and 47 respectively, the fluid supply to the ram cylinders 46a, 47a, being controlled by valve mechanism, hereinafter described, which is automatically operated to alternately bring the respective rams into operation. Thus as one of the rams completes its downward or electrode feeding stroke the valve mechanism is actuated so that the other ram commences its downward or feeding stroke whereby the electrode is continuously fed towards the work through the medium of the aforesaid gearing and free wheel device. As seen in Figures 1 and 2 each of the rams is connected to a weight 51 by a flexible operating line 52 which is anchored at its inner end as at 53 and passes over suitably arranged guide pulleys upon the ram and the machine frame, said line being connected at its outer end to the weight. The latter is raised as the respective ram moves in one direction (on its upward or idle stroke) and falls as the respective ram moves on its opposite or downward stroke, thereby maintaining tautness in the flexible operating line 52 and causing the electrode feeding gear to feed the electrode forwardly towards the work.

The said operating lines 52 co-operate with the free wheel device 43 which may consist of a length of sprocket chain 56 inserted in each of the operating lines, these chains being adapted to engage sprocket wheels 57 which turn the electrode feeding rollers or the like 36 when moved in one direction and rotate idly and independently of said feeding rollers as the respective chain and sprocket wheels move in the opposite direction.

It will be evident from the foregoing that as the rams 46, 47 move alternately on their working or electrode feeding strokes the respective free wheel gear 43 connected with each ram actuates the associated feed rollers or the like 36 to feed the electrode 6 forwardly and as each ram completes its working stroke the feeding operation is taken up by the other ram and operating line which, through the medium of its associated free wheel gear, ensures a continuous feed of the electrode so that an uninterrupted feed motion is obtained by means of a simple and reliable apparatus. On the return or idle stroke of each ram the respective free wheel gear permits its operating line 52 to move similarly in a reverse direction without influencing the electrode feed rollers or the like.

During the forward feed of the electrode, as above-mentioned, the cord or like winding 24 is applied thereto from the various spools 22 of the rotary spool carrier, the thread being impregnated with a flux coating material in the form of a suitable paste or liquid which may be applied to the threads by passing the latter through a bath of the flux as the thread is wound onto the respective spool and before the spools are fitted to the carrier. Alternatively the cord or thread 24 may be drawn through a bath of the flux material and wound onto the electrode through the medium of a spool or the like rotating about the electrode during the welding operation. In either case the fluxing material is maintained in a moistened state upon the cord or thread so that it exerts a cooling influence upon the electrode and becomes baked or securely adhered thereto as the moisture in the coating evaporates owing to the heat adjacent the arc. The aforesaid plate spring members 28 also ensure that the moistened flux coated threads are pressed compactly and uniformly around the electrode as aforesaid.

The valve gear for controlling the supply of fluid to the hydraulic ram cylinders 46a, 47a may comprise inlet valves 46b, 47b for admitting the fluid from a water supply main 61 and outlet valves 46c, 47c by which the water escapes from the ram cylinders through an outlet pipe 62 to a main control valve 63 which is preferably automatically operated by means of an electromagnetic device 64 connected into the welding circuit as described in my prior United States specification Serial No. 590,504 of 2nd February, 1932.

The said inlet valves 46b, 47b may be mounted upon an upper valve support 66 and the outlet valves 46c, 47c upon a lower valve support 67 attached to the machine frame 2 in such positions that the valves may be actuated by cams or tappets 68, 68a which are carried by the rams and are adapted to function as the rams alternately reach or approach the upper and lower limits of their travel. The tappets 68a are preferably spring influenced so that they may be displaced, for example, during the up stroke of the rams and automatically assume their operative positions during the return or down stroke thereof.

According to one suitable embodiment as illustrated in Figures 10 to 12 of the drawings, the mechanism for operating the inlet valves comprises two pairs of co-operating wrist plates 69, 70 and 71, 72 mounted at opposite sides of the rams and adapted to open and close the respective inlet valves. The wrist plates of each pair are operatively connected together by outstanding lever arms 73 and connecting rods 74.

Each wrist plate is freely mounted upon a spindle 75 outstanding from the support 66 and carries a roller or abutment 69a, 70a, 71a and 72a adapted to be periodically engaged by one of the aforesaid tappets 68, 68a whereby the associated wrist plates are turned about their spindles.

Associated with each pair of wrist plates is a weighted lever arm 78 and a pivoted disc 79, which is operatively connected by a connecting link 81 to its respective inlet valve. Both the weighted lever arms 78 and the pivoted discs are preferably mounted upon their respective spindles 75 and each member is capable of swinging freely thereon. Outstanding pins or stops 82 are carried by both the pivoted discs 79 and the associated wrist plates 69, 71, the stops on the wrist plates being adapted to raise the weighted lever arms during turning movement of said wrist plates as aforesaid until it has been carried over its elevated dead centre position as shown in Figure 12 whereupon the weighted arm falls and strikes one of the stops 82 on its associated pivoted disc, thereby turning the latter and either opening or closing its respective inlet valve.

Figure 12 illustrates the movements of one section of the inlet valve gear during the opening and closing of the valve 47b for example. The left hand ram 47 has commenced its downward or working stroke and in passing its associated wrist plate 69, the tappet 68a on this ram, has moved the roller 69a from an upper to a lower position as indicated in dotted lines, thus turning the wrist plate about its pivot and lifting the weighted lever arm 78 into its raised position, from which it has fallen under the influence of its own weight and imparted a turning movement to the associated pivoted disc 79 by means of the aforesaid stops 82. Movement of the disc 79 functions to close the inlet valve 47b by means of the link 81.

The aforesaid turning movement of the wrist plate 69 also turns the companion wrist plate 70 and moves its roller 70a from an upper to a lower position as shown. As the right hand ram 46 is nearing the end of its up stroke, the tappet 68 thereon strikes the roller 70a and returns it to its upper position, thus lifting the weighted lever arm 78 over its dead centre position as aforesaid and permitting it to fall and open the inlet valve 47b for the purpose of again raising the ram 47. The means for opening and closing the other inlet valve 46b is identical with the mechanism above described, for operating the valve 47b, the arrangement being such that as one inlet valve is being opened the other valve is being closed.

Figures 13 and 14 illustrate suitable mechanism for operating the outlet valves 46c, 47c, and this mechanism may comprise one pair of pivoted wrist plates 86, 87, one of which 86, is provided with a co-operating weighted lever arm 88, pivoted disc 89, and outstanding stops 91 adapted to be engaged by said lever arm. The two outlet valves are operatively connected together as at 92 so that they may be operated in unison, both valves being connected to the pivoted disc 89 by a connecting link 93.

Each of the wrist plates 86, 87 is provided with a roller 86a, 87a adapted to be engaged by a tappet on the respective rams, the two wrist plates being mounted in diagonally spaced relationship at opposite sides of the rams, one plate 86 being associated with the ram 47 whilst the other wrist plate is associated with the ram 46. Simultaneous turning movement of the two wrist plates is effected by means of an intermediate transfer shaft 94 carrying outstanding lever arms 94a which are connected to the respective wrist plates 86, 87 by connecting rods as seen in Figure 14.

In operation as either ram is nearing the end of its down stroke one of its tappets engages a roller 86a or 87a thus turning the interconnected wrist plates and raising the weighted lever arm into an elevated position as aforesaid, from which it falls, turns its co-operating pivoted disc and thus simultaneously closes one of the outlet valves and opens the other.

The mechanism for operating the inlet and outlet valves is co-related in such a manner that by admission of the fluid to the cylinders the rams and their respective weights may be alternately raised during which period the free wheel gear 43, corresponding to the respective ram, rotates idly without interfering with the operation of the electrode feed rollers 36 during the down stroke of the companion ram. By the opening of the outlet valves and the closing of the corresponding inlet valves the respective rams and weights are permitted to move alternately downwards as the water passes through the outlet pipe to the main control valve 63 which is automatically operated by the aforesaid electromagnetic control device 64 in accordance with current fluctuations in the arc welding circuit whereby a regular and steady feeding of the electrode is ensured.

The device for spraying the electrode with a cooling liquid adjacent the arc may comprise a nozzle 97 mounted near the aforesaid rotary spool carrier 3 and connected with a compressed air and water supply 98 whereby a fine spray of moisture may be directed onto the electrode 6 and its coating and onto the aforesaid electrode guide sleeve 4 adjacent the point at which the electrode emerges therefrom. Undue heating of the electrode and its guide sleeve may be thus obviated and thereby uniformity in the condition of the flux coating and the conductivity of the electrode may be maintained. The nozzle 97 may be adjustable as, for example, about a pivot 97a on the machine frame so that the spray may be directed onto any desired portions of the installation. For instance, the liquid may be thus directed, if desired, onto the spools 22 so that the flux coated threads thereon may be kept in a moistened state.

In order to protect the workman or attendant against the effects of the fumes arising from the arc, a hood 101 is preferably positioned around the electrode and supported as at 102 from the machine framework at a position between the aforesaid guide sleeve 4 and the work 7. This hood is connected by an exhaust conduit 103 with a fan or the like 104 whereby the fumes may be withdrawn from the region of the arc and discharged at a distance therefrom. The hood may be pivotally mounted upon its support as at 106 and may be provided with an opening or window 107 through which the operator may observe the arc. The hood may be also fitted with a hand lever 109 whereby the hood may be moved to manually guide or manipulate the arcing end of the electrode in relation to the work.

Having now described my invention what I claim as new and desire to secure by Letters Patent is:—

1. Improvements in and relating to the art of electric arc welding comprising in combination means for feeding an electrode towards the work, means for winding a covering thread around the electrode during the electrode feeding movement and a resilient driving connection between said electrode feeding means and said thread applying means adapted to permit of a limited degree of independent movement or overrun between said electrode feeding means and said thread applying means.

2. Apparatus according to claim 1 wherein said driving connection consists of a resilient or elastic endless band extending between the electrode feeding means and the thread applying means.

3. Apparatus according to claim 1 wherein said resilient driving connection connects the electrode feeding mechanism with a rotary spool carrier which is adapted to rotate about the electrode and supports spools upon which the said covering thread is coiled.

4. Improvements in and relating to the art of electric arc welding characterized by electrode feeding means comprising a plurality of driving elements adapted for alternate operation to feed the electrode forwardly to the work when moved in one direction and means whereby said driving elements are operatively disconnected from the electrode when the respective driving element moves in a reverse direction.

5. Apparatus according to claim 4 wherein said driving elements are adapted to operate alternately to effect the electrode feeding movement through the medium of a free wheel gear during the movement of the respective driving element in one direction and said free wheel gear permits said driving element to move in a reverse direction without influencing the electrode.

6. Improvements in and relating to the art of electric arc welding consisting in the combination of a pair of hydraulic rams adapted to operate alternately to feed the electrode forwardly towards the work as the respective ram moves in one direction and mechanism including free wheel gearing associated with said rams whereby they are permitted to move alternately in a reverse direction without influencing the electrode so that a continuous electrode feeding movement is thus obtained.

7. Apparatus according to claim 6 wherein a separate free wheel gear is associated with each said ram and with a common electrode feeding mechanism which is continuously operated by the alternately operating rams.

8. Apparatus according to claim 6 wherein a separate free wheel gear is associated with each said ram and with a common electrode feeding mechanism, a flexible operating line extending between each said free wheel gear and its respective ram whereby said electrode feeding mechanism is continuously operated by the alternately operating rams.

9. Apparatus according to claim 6 wherein a separate free wheel gear is associated with each said ram and with a common electrode feeding mechanism, a flexible operating line extending between each said free wheel gear and its respective ram, each said flexible operating line being connected at one end to a weight, the free wheel gear being located intermediately of the length of the operating line between the respective ram and weight.

10. Apparatus according to claim 6 wherein a separate free wheel gear is associated with each said ram and with a common electrode feeding mechanism, a flexible operating line extending between each said free wheel gear and its respective ram whereby said electrode feeding mechanism is continuously operated by the alternately operating rams, each said flexible operating line consisting of, or being provided with, a sprocket chain adapted to engage a sprocket wheel of said free wheel gear.

11. Apparatus according to claim 6 in combination with valve mechanism actuated by said rams and adapted to control the alternate movements thereof in opposite directions.

12. Apparatus according to claim 6 in combination with valve mechanism actuated by said rams and adapted to control-the alternate movements thereof in opposite directions, and a main control valve which is operated by an electromagnetic device connected into the arc welding circuit, said main control valve being adapted to control the escape of water through an outlet pipe passing from the ram cylinders.

13. Apparatus according to claim 6 in combination with valve mechanism actuated by said rams and adapted to control the alternate movements thereof in opposite directions, said valve mechanism comprising inlet and outlet valves mounted upon upper and lower supports located adjacent to the upper and lower limits of travel of the respective rams, and cam members or tappets carried by said rams to alternately actuate said inlet and outlet valves.

14. Apparatus according to claim 6 in combination with valve mechanism actuated by said rams and adapted to control the alternate movements thereof in opposite directions, said valve mechanism comprising cam members or tappets carried by said rams, and adapted to periodically engage a plurality of displaceable rollers or abutments which are operatively connected to inlet and outlet valves for controlling the passage of fluid through inlet and outlet pipes communicating with the ram cylinders.

15. Apparatus according to claim 6 in combination with inlet and outlet valve mechanism actuated by said rams and adapted to control the alternate movements thereof in opposite directions, tappets carried by said rams and a plurality of displaceable rollers or abutments operatively connected to said inlet and outlet valves, the abutments associated with said inlet valves being carried by two sets of pivoted wrist plates, the wrist plates of each set being operatively connected to their respective valve and to each other so that they may turn in unison, the abutments on the wrist plates of each set being normally positioned in alignment with the tappets carried by the respective rams so that while one ram is adjacent to its upper limit of travel its tappets function to close one of the inlet valves and open the other valve, whilst when the other ram is adjacent to its upper limit of travel its tappets open the valve that was closed and close the valve that was opened by the first mentioned ram.

16. Apparatus according to claim 6 in combination with inlet and outlet valve mechanism actuated by said rams and adapted to control the alternate movements thereof in opposite directions, tappets carried by said rams and a plurality of displaceable rollers or abutments operatively connected to the inlet and outlet valves, said outlet valves being operatively connected together whilst the abutments associated therewith are carried by a system of interconnected pivoted wrist plates, the said last mentioned abutments being normally positioned in alignment with tappets carried by the respective rams whereby, when one of the rams is adjacent to its lower limit of travel, one of its tappets functions to swing said system of wrist plates about their pivots, thus closing one of the outlet valves and opening the other valve whilst when the other ram is adjacent to its lower limit of travel, one of its tappets functions to reverse the position of said outlet valves.

17. Apparatus according to claim 6 in combination with inlet and outlet valve mechanism actuated by said rams and adapted to control the alternate movements thereof in opposite directions, said valve mechanism comprising tappets carried by said rams, a plurality of displaceable rollers or abutments carried by sets or systems of pivoted wrist plates, the wrist plates of each set being operatively connected to their respective valve and to each other so that they may turn in unison, and a weighted lever arm associated with each set of wrist plates and adapted to be raised during turning movements thereof, and then permitted to fall and either open or close the valve with which said weighted lever arm is associated.

18. Apparatus according to claim 6 in combination with inlet and outlet valve mechanism actuated by said rams and adapted to control the alternate movements thereof in opposite directions, said valve mechanism comprising tappets carried by said rams, a plurality of displaceable rollers or abutments carried by sets or systems of pivoted wrist plates, the wrist plates of each set being operatively connected to their respective valve and to each other so that they may turn in unison, and a weighted lever arm associated with each set of wrist plates, a pivoted disc or the like being associated with each said lever arm and operatively connected to one or more of the valves, said disc and adjacent wrist plate being provided with a plurality of stop members adapted to engage said lever arm, the stop members on the wrist plates being adapted to lift the weighted lever arm into an elevated position whilst the stop members on the pivoted discs are adapted to be engaged by the weight arm as it falls and thus operate their respective valve or valves.

19. Improvements in and relating to the art of electric arc welding consisting in the combination of electrode feeding means, means operatively associated with said feeding means for winding a covering thread onto an electrode as the latter is fed forwardly towards the work, and means adapted for directing a spray of cooling liquid onto the said electrode covering.

20. Improvements in and relating to the art of electric arc welding consisting in the combination with electrode feeding means of a rotary spool carrier adapted to rotate about an electrode by a driving connection operatively associated with said electrode feeding means, said carrier supporting spools of electrode covering thread whereby the threads are wound around the electrode by rotary movement of the spool carrier and simultaneous feeding movement of the electrode, and a nozzle mounted adjacent said spool carrier and adapted to direct a cooling spray of liquid onto the said electrode covering thread and adjacent parts.

21. Improvements in and relating to the art of electric arc welding consisting in the combination of a pair of hydraulic rams connected by flexible operating lines with associated electrode feed mechanism including a free wheel gear whereby the electrode feeding movement is effected by each ram alternately, a rotary spool carrier adapted to rotate about the electrode and to support spools of electrode covering thread which is wound about the electrode as the said carrier rotates, a driving connection between said spool carrier and said electrode feed mechanism, valve mechanism operated by said rams and adapted to control the passage of the hydraulic fluid to and from the ram cylinders and a main control valve automatically governed by means electrically connected into the arc circuit, said main control valve being adapted to control the escape of water through an outlet pipe from the ram cylinders.

22. Apparatus according to claim 1 wherein said resilient driving connection connects the electrode feeding mechanism with a rotary spool carrier which is adapted to rotate about the electrode and supports spools upon which the said covering thread is coiled, said spool carrier being mounted to rotate about a guide sleeve through which the electrode passes, said guide sleeve being provided with spring pressed contacts connected to terminals on said sleeve whereby electric current is conducted to the electrode adjacent to its arcing end.

23. Apparatus according to claim 1 wherein said resilient driving connection connects the electrode feeding mechanism with a rotary spool carrier which is adapted to rotate about the electrode and supports spools upon which the said covering thread is coiled, said spool carrier being mounted to rotate about a guide sleeve through which the electrode passes, said guide sleeve being provided with spring pressed contacts connected to terminals on said sleeve whereby electric current is conducted to the electrode adjacent to its arcing end, said sleeve being fitted with an internal metal liner surrounded by an insulating sleeve.

WALTER REGINALD HUME.